March 18, 1958 R. C. DU BOIS 2,827,068
CONTROL APPARATUS
Filed Feb. 24, 1955 2 Sheets-Sheet 1

INVENTOR.
Robert Clark Du Bois
BY
Arthur H. Swanson
ATTORNEY.

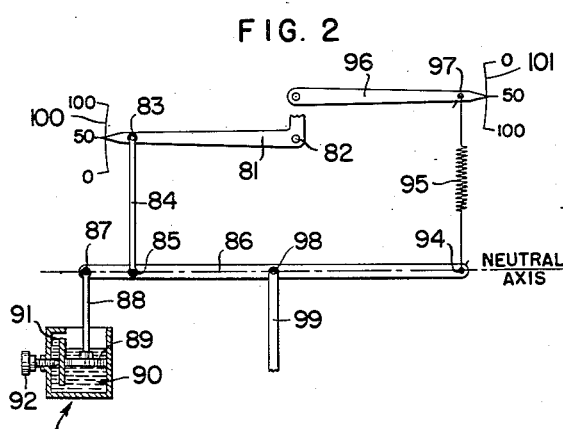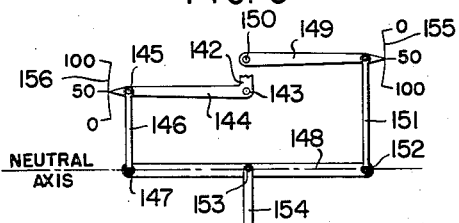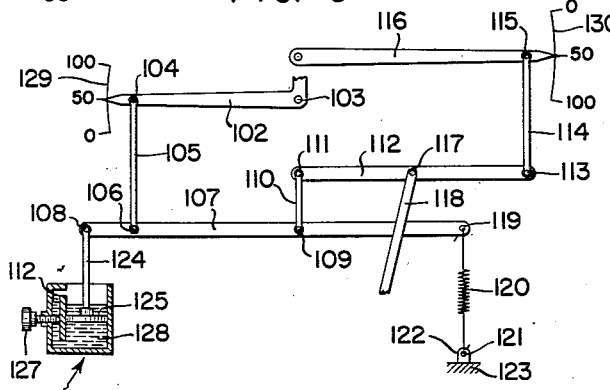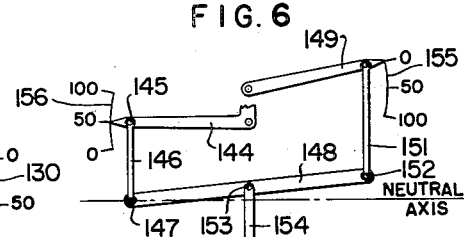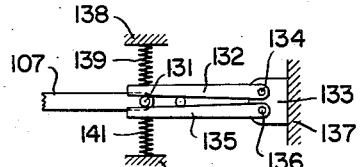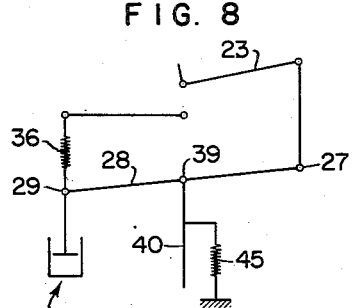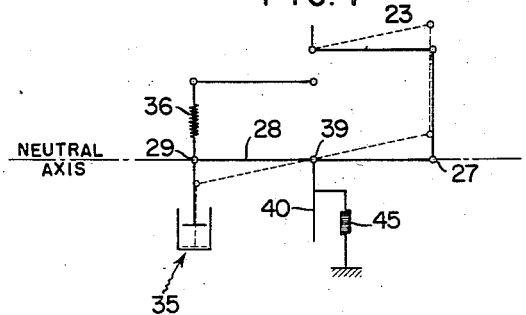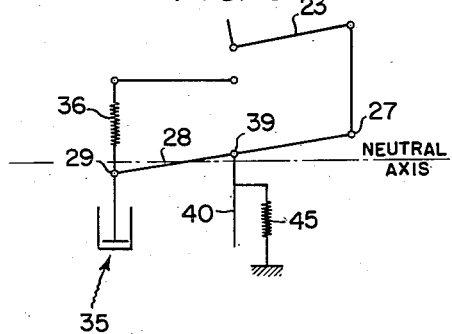

United States Patent Office 2,827,068
Patented Mar. 18, 1958

2,827,068

CONTROL APPARATUS

Robert Clark Du Bois, Fairfield, Conn., assignor to Minneapolis-Honeywell Regulator Company, Minneapolis, Minn., a corporation of Delaware Application February 24, 1955, Serial No. 490,271

11 Claims. (Cl. 137—85)

A general object of the present invention is to provide an ancillary compensating means which will overcome the integral or reset action of a motion type controlling apparatus.

A more specific object of the present invention is to provide an ancillary means for positioning a control portion of a conventional controlling apparatus so that following a shut down of a control process, a more advantageous control action by the control apparatus may be affected during automatic start-up.

This ancillary means is particularly useful in a batch operated process containing lags such as is the case where it is desired to control the flow of a heating medium, e. g. steam, flowing into a heat exchanger in accordance with the temperature of the product to be heated by the exchanger. Still another useful application of this ancillary compensating means might well be its use with a controlling apparatus that is used to control the flow of fuel oil being fed into a furnace in accordance with the temperature of the interior of such as furnace. In each of the aforementioned applications the ancillary means will introduce an input motion into the controlling apparatus, as the process being controlled by the controller is shut down, which motion will reduce the time that is normally required during start-up of such a process for altering the output signal to a desired set point value.

This ancillary compensating means will thus enable a controlling apparatus to permit large initial flows of fluid into either the exchanger or furnace noted supra during automatic start-up and then later to rapidly reduce such a flow so that the temperature of the exchanger or furnace will not overshoot a predetermined set point value.

Thus, still another more specific object of the invention is to provide an ancillary means with a motion type integral acting controller so that the integral functional relationship existing between a control variable, and the resulting position of a final control element, is momentarily altered during automatic start-up. Such an integral functional relationship is present, for example, in a control instrument of the widely used type, one form of which is disclosed in the Moore Patent 2,125,081 of July 26, 1938.

Another object of the invention is to provide the aforementioned well known type of controller with an ancillary means in the form of a compensating rate unit so that a compensating rate action may precede the reset control function of the controller.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

In the drawings:

Fig. 2 shows a modified form of an ancillary means in the form of a compensating rate unit which may be substituted for the ancillary means shown in Fig. 1;

Fig. 3 shows still another modified form of an ancillary means in the form of a compensating rate unit which may be substituted for the ancillary means shown in Fig. 1;

Fig. 4 shows a modified form of spring means which may be substituted for the spring shown in Fig. 3;

Fig. 5 shows an ancillary means similar to that as shown in Fig. 1 but without the aforementioned figure's biasing and dampening means;

Fig. 6 shows the position that the links shown in Fig. 5 will take when the magnitude of the variable being measured drops to zero;

Figure 1:
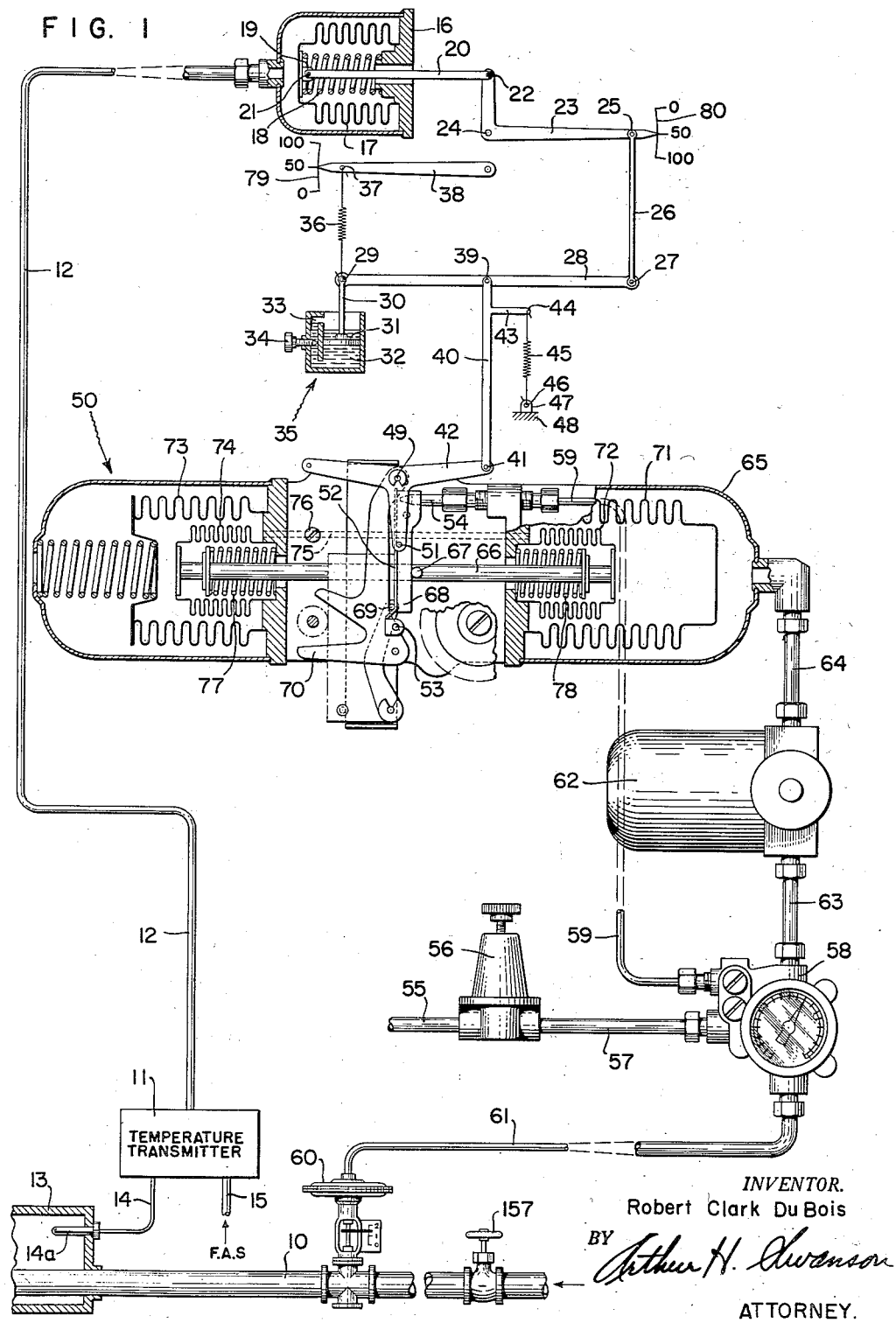
Fig. 1 shows a controlling apparatus which includes the controller shown in Fig. 1 of the Moore Patent 2,125,081 granted July 26, 1938, a rate unit in the feedback line line of this controller and an ancillary means in the form of a compensating rate unit whose control action is effected ahead of the action of the controller.

Fig. 7 shows the position that the links of the ancillary means shown in Fig. 1 will take when the controller's output pressure is of such magnitude that it is producing the desired control effect indicated by the set point index of the controller or, in other words, when the variable being recorded by the pen of the controlling apparatus is lining out at the set point, and this figure also shows, in dotted line form, the position to which the linkage will be moved during automatic start-up;

Fig. 8 shows the position that the links in Fig. 6 will take at an instant of time after the process being controlled is shut down; and Fig. 9 shows the final position the links of the ancillary means shown in Fig. 6 will take when the process being controlled is shut down.

Unless otherwise noted, corresponding components shown in the various figures carry corresponding reference characters.

As shown in Fig. 1 of the drawings, there is a conduit 10 through which a fluid such as steam is permitted to flow in the direction of the arrow, into a chamber e. g. a heat exchanger 13. At the left end of this conduit adjacent the exchanger there is shown a temperature measuring and transmitting device 11 for automatically varying the controlled variable pressure flowing through a transmission line 12 in accordance with the temperature of a product in the heat exchanger 13. Any type of conventional temperature measuring and transmitting means may be used for the device schematically shown as reference numeral 11. For example, any means which is capable of measuring and transmitting a pressure representative of the temperature sensed by a suitable bulb 14a and liquid filled line 14 would be suitable. One such temperature measuring and transmitting device might well be the transmitter shown in the Konrad H. Stokes et al. patent application Serial No. 347,812 filed April 9, 1953. The controlled variable pressure flowing through the transmission line 12 is connected to a standard pneumatic receiving means containing a casing 16, a bellows 17, a spring 18, and a lug 19 fixedly attached to the closed end of the bellows 17. A link 20 is shown pivotally connected by means of a pin 21 to the lug 19 at one of its ends and pivotally connected by means of a pin 22 to a bell crank pen arm 23 which is pivotally mounted on pivot pin 24.

To the outer end of the horizontal leg of the bell crank 23 shown in Fig. 1, there is attached, by means of a pin 25, a second link means 26. The downwardly extended end of this second link means is pivotally attached by means of a pin 27 to the right end of another beam 28. To the lower portion of the extreme left end of this other beam there is attached by means of the pin 29 a piston rod 30. Fixedly attached to the lower end of this piston rod 30 there is shown a piston 31 surrounded by a fluid 32. Any conventional passageway such as the passageway 33 may be used to connect the fluid on the top of the piston to the fluid in the space below the piston. Any form of a restricting means such as the restricting means 34 may be used to restrict the flow of fluid passing through the passageway 33 from one side of the piston to the other. The parts represented by reference characters 30–34 thus form a dampening means or dash pot 35 of the well known type.

To the upper portion of the left end of the error beam 28 there is shown a biasing or spring means 36 pivotally connected to pin 29 at one of its ends and hooked into an aperture 37 of a manually adjusted set point index lever 38.

At the center of the error beam 28 there is shown fixedly attached thereto a pivot pin 39. An error link 40 is shown pivotally mounted at its upper end on the pivot pin 39 and at its lower end to a pivot pin 41 fixedly attached to a flapper valve actuating three armed lever 42. Protruding from the upper portion of the error link 40 there is shown a lug 43 having an aperture 44. One end of a biasing means such as is indicated by the coil spring 45 is shown hooked into the aperture 44 of the lug 43. The other end of the coil spring 45 is shown hooked into an aperture 46 in a lug 47. The lug 47 is shown fixedly attached in any suitable manner such as by welding to a stationary member 48.

In Fig. 1 the flapper valve actuating three armed lever 42 is shown pivotally mounted on a pivot pin 49 whose position is determined by the proportional band dial setting (not shown) of the aforementioned Moore controller 50. A pivot pin 51 is shown fixedly mounted on the lower arm of the three armed lever 42 and in contact with the flapper 52. This flapper 52 has one of its ends fixedly attached to the controller 50 by means of a spring biased pin means 53 which tends to rotate the free end of the flapper 52 toward a nozzle 54, which nozzle is fixedly attached to the controller 50. This nozzle 54 receives a regulable supply of air through an air supply conduit 55, pressure regulator 56, conduit 57, a passage not shown, flowing through a conventional pilot valve 58 and to a conduit 59. The pilot valve 58 is shown connected to the head of a control valve 60 by means of a conduit 61. The pilot valve is also shown connected to a rate unit 62 by means of a conduit 63. This rate unit in turn is shown connected to the controller 50 by means of a conduit 64.

From the above description it can readily be seen that when the pressure of the controlled variable being administered to the bellows wall 17 of the pneumatic receiver is being increased by the transmitter 11, the parts 23, 26 of the ancillary means will act on the error beam 28 so as to move the right end of the error beam 28 in a downward direction and cause the error link 40 through means of the pivot pin 39 and 41 to rotate the flapper valve actuated three armed lever 42 in a clockwise direction about its pivot 49. When this latter action takes place the pin 51 on the three armed lever 42 will be moved to the left and away from the nozzle 54 and thus permit a greater percentage of the air flowing through the nozzle to be bled to atmosphere. This latter action will cause a decrease in pressure in the fluid flowing through the conduit 59 back to the pivot valve 58. The decrease in pressure of the fluid flowing through the conduit 59 will in turn enable the pilot valve 58 to send out a proportionately reduced pressure signal through the conduit 61 to a reverse acting control valve 60 in order to immediately correct the increase in flow of fluid through the conduit 10 sensed by the transmitter 11. This reduced control pressure output of the pilot valve is also sent through the conduit 63, rate unit 62 through conduit 64 to chamber 65 of control unit 50. The rate unit 62 is comprised of a well known fluid regulating means that enables a linear relationship to be maintained between the rate of change of the control variable and the position of the valve 60. Because of the pressure reduction in the chamber 65 and on the chamber formed by the bellows 71, 72, as a result of the flapper movement to the left, the rod 66 will move to the right. A pin 67 on the rod, a lever 68, a second pin 69 and a lever 70 upon which the three armed lever 42 is pivoted are used to move the pivot pin 49 of this latter lever to the right and thereby move the flapper toward the nozzle 54. The amount of this movement for a given movement of the rod 66 can be varied by shifting the pin 69 upwardly or downwardly between levers 68 and 70.

The third or reset movement of the flapper is accomplished as the liquid flows from between the bellows 71 and 72 to another liquid filled chamber that is formed between a pair of bellows 73 and 74 on the left portion of the instrument. The liquid flows from its left chamber to its right chamber through a pipe 75 which has in it an adjustable valve or restriction 76. The speed of movement of the rod 66 is determined by the strength of a pair of springs 77, 78 which tend to return the rod to its midposition and the amount of opening to which the valve 76 has been set.

The set point index lever 38 and the controlled pressure actuated bar 23 are each shown lined out at 50% of their respective indexes 79, 80. When the index links 23 and 38 are in this position the output pressure of the controller that is being administered to the head of the control valve 60 is of such a magnitude that the desired flow of fluid through the conduit 10 is being obtained.

The function of the apparatus of Figure 1 thus far described has been that function which occurs during normal operation. During such an operation the lever arms of the ancillary compensating means will be operative about the neutral axis shown in Figure 7.

Previous to the present invention motion type controlling apparatus, such as is characterized by the reference numeral 50 in Fig. 1, have used an ancillary means such as the means 142–156 disclosed in Fig. 5 of the drawing. This ancillary means 142–156 is shown with a neutral axis passing through the center of the pivots 147, 152, 153. This means has a manually adjusted set point index lever means 143–146, 156 and a pen arm means 150–152, 155. The lever and pen arm means is used to respectively apply set point and variable changes to a beam means 148, 153 to control the action of an error link 154. This ancillary means differs from the ancillary means disclosed in the present invention, such as e. g. is disclosed in Figs. 1 and 7, in that the former mentioned means does not possess the biasing and damping means 36, 45, 35 that is present in the later mentioned figures. As hereinafter described the presence of such biasing and damping means will enable the controller 50, shown in Fig. 1, to effect a much more ideal form of control during start-up or during a step change in the magnitude of a variable such as temperature, than would be afforded when the type of ancillary means shown in Fig. 5 were used.

During an instant of time after the apparatus shown in Fig. 7 is shut down, as by the closing of valve 157, the ancillary compensating means will initially assume the position shown in Fig. 8. This Fig. 8 position is the position that the linkage will assume as the pen arm 23 is automatically moved by spring means 18–22 to its zero position from its substantially fixed central or horizontal position. The dash pot 35 will remain in a substantially fixed position as the linkage is moved from its Fig. 7 solid line position to its Fig. 8 position. As this latter action takes place the spring 45 will be changed from its normally compressed position shown in Fig. 7 to its elongated or tensioned position shown in Fig. 8. After a period of time, the dash pot 35 will be readjusted in a downward direction to the position shown in Figure 9. The dash pot will be forced into this lower position by the downward force of the biasing spring 45 after the latter has been elongated to a predetermined position.

Because of this spring and dashpot arrangement the ancillary compensating means will thus be placed in the position shown in Fig. 9 during the shut down of a process rather than in the conventional position shown in Fig. 6.

Next to be considered is the start-up of the apparatus. The start-up is initiated by opening the valve 157 to its full open position to admit steam through conduit 10 to the chamber 13. As the control pressure from the transmitter 11 builds up due to an increase in the variable, e. g. temperature being measured by bulb 14a, the pen arm 23 will be moved toward the dotted line position shown in Fig. 7.

In the dotted line position shown in Fig. 7 the spring 45 is still exerting its downward force on beam 28 so as to hold the pivot 29 below the neutral axis similar to its action as disclosed under the description of Fig. 9. However, when the ancillary means is in the dotted line position shown in Fig. 7 the spring 45 has pulled the left end of the beam down to such an extent that the pivot 39 will be forced down to the neutral axis before the pivot 27 at the right end of the beam has had a chance to reach the neutral axis. During the movement of the ancillary means from the position shown in Fig. 9 to the dotted line position shown in Fig. 7 the dash pot 35 will tend to remain in a substantially fixed position. During this stage of operation, as the input pressure signal continues to increase toward the set point, motion of the pen arm will be reflected through the error beam 28 to the crank arm 42 to create a movement of the flapper 52 away from the nozzle 54. The effect of this flapper movement is to cause the output pressure from the controller to deviate beyond its normal control value until the dash pot 35 has moved up to its normal position as depicted by the neutral axis shown in Fig. 7.

The net effect of this overshoot in the output signal from the controller is to automatically reduce the quantity of fluid flowing through the control valve 60, during a predetermined instant of time after automatic start-up, to such a point that the temperature being sensed by the bulb 14a will not overshoot the predetermined set point of the ancillary means. Furthermore, this ancillary means when used in conjunction with a motion type controller, such as the controller 50 of Fig. 1, will permit a compensating rate acting type of control action on the control valve 60 to take place during automatic start-up. This control is characterized by the ability of the ancillary means to cause the controller to place the control valve 60 in the flow line in a wide open position during shut down and to retain it in this wide open position during initial stage of start-up and then to rapidly close the valve just before the pen arm 23 has reached the set point value determined by the position of arm 38. This compensating rate action is made possible because of the way the springs 36, 45 and dampening means 35 in Fig. 9 act on the pivot 39. The action of these springs 36, 45 and dampening means is such that only a small amount of downward movement of the pen arm 23 need be made to enable the ancillary linkage to move the pivot 39 down to the neutral axis as is represented by the dotted line position in Fig. 7. When this latter position is reached a zero error signal will be transmitted to the controller 50, of Fig. 1. When this zero error signal position is reached the ancillary linkage is introducing an input control signal which signifies that the pen arm is being lined out at some preselected set point value. However, with the conventional ancillary linkage shown in Fig. 6 it is necesary to move the pen arm 149 all the way down to a horizontal position before such a lining out of the pen with the set point will normally be realized by its associated controller. The ancillary rate compensating means shown in Fig. 7 thus reduces the time normally required by a conventional ancillary means to make the pen arm line out at some predetermined set point value.

Fig. 2 shows a modified form of the ancillary apparatus which may be substituted for the parts identified in the Fig. 1 showing as reference characters 23–40, 43–46. The chief difference between the modified form of the ancillary means shown in Fig. 2 represented by reference characters 81–101 and the ancillary means shown in Figure 1 is that the set point control index link 96 is acting on the right end of the beam 86 rather than the left end as in Fig. 1. Another difference is that the pen actuating link 81 is connected by means of a link 84 and pin 85 at a point spaced from the left end of beam 86 rather than at a point at the extreme right end as shown in Fig. 1. With the arrangement of the pivot 85 shown in Fig. 2 it will eliminate the need of a second spring e. g. the spring 45 as shown in Fig. 1. Despite the difference in arrangement of the linkage shown in Fig. 2 over that shown in Fig. 1 the linkage in Fig. 2 is capable of performing essentially the same function as that already described for Fig. 1. For instance, while the pen actuating link 81 of Fig. 2 is moved to its zero position during shutdown, and the index link 96 remains at the fifty percent of index scale position, the piston 89 of dash pot 93 will be moved in a downward direction. As this downward motion of the piston takes place it will cause the spring 95 to be compressed beyond its normally expanded position as shown in Fig. 2. During an instant of time after the process is shut down the piston 89 will be moved to its lowermost position in the dash pot 93. This action will cause the pivot 98 to be positioned at a point which is substantially below that shown in Fig. 2. During an instant of time after the piston starts to move to its aforementioned lowermost position the spring 95 will exert an upward force on the beam 86 and the pivot 98. This upward force exerted on the pivot 98 in this manner will cause the right end of the beam to be tilted in a counterclockwise direction about the pivot 85. This last mentioned action will cause the pivot to be repositioned from a point which is substantially below the neutral axis to a point which is very close to the neutral axis. During a start-up of the controlled process, with the ancillary apparatus starting from this last mentioned position, it is possible to introduce a zero error signal into the error link 99 of a controller. This will take place when the pen arm means 81, 84, 85 and the left end of the beam 86 moves the pivot 98 in an upward direction during the automatic start-up.

Fig. 3 shows still another modified form of an ancillary apparatus which may be used with the control unit 50 shown in Fig. 1. The ancillary apparatus shown in Fig. 3 represented by reference numerals 102 operates in a manner similar to the ancillary apparatus shown in Fig. 2. The chief difference between Fig. 3 and Fig. 2 is that an additional beam 112 and links 110, 114 have been inserted between the control index 116 and the base of a horizontal link 107. Another difference is that the error link 118 has been pivotally attached to this intermediate beam 112 at 117 rather than connected to a beam forming the base of a rectangular shaped linkage such as represented in Fig. 1 by reference character 28 and in Fig. 2 by reference character 86. Although the ancillary linkage shown in Fig. 3 has but one spring 120 this linkage can perform the same function as that described for Fig. 1 because of the unique arrangement of the pivot 106 with respect to the pivot 108 and 109 shown in this figure. The arrangement shown in Fig. 3 also has the added advantage in that a change in set point will effect the controller directly and without lag.

Fig. 4 shows an alternative spring means 131–141 which may be substituted for the spring means 120 shown in Fig. 3. This alternative spring means comprises a pin 131 which is fixedly attached to and protrudes from the horizontal link 107, an arm 132 in slidable engagement with the upper cylindrical portion of the pin 131 at one of its ends and pivotally mounted on a fixture 133 by means of a pin 134 at its opposite end. This fixture 133 in turn is fixedly mounted in any suitable manner such as by welding to a stationary support 137. A similar arm 135 forms another portion of this spring means and has one of its ends in slidable engagement with the lower portion of the pin means 131, and its other end pivotally mounted by means of a pivot pin 136 to the fixture 133. Between the top of the arm 132 and the stationary member 138 adjacent the pin 131 there is shown a coil spring 139. Also, between the lower portion of the arm 145 adjacent the pin 131 and a stationary member 140 there is shown a coil spring 141.

It can readily be seen that if the biasing or spring means 131–141 shown in Fig. 4 is substituted, for example, for the spring means 120 shown in Fig. 3, it provides a spring component 39 which may be compressed when the right end of the horizontal link 107 is moved in an upward direction as well as a spring component 141 which will be compressed when the link 107 is moved in a downward direction. Another function of this spring means 131–141 is to constantly tend to return 107 to its original horizontal position.

By placing any one of the novel ancillary means, disclosed in the present invention, ahead of a controller, such as an input motion type of controller 50 shown in Fig. 1, it will superimpose on such a controller a rate compensating action as a step change in a variable occurs. This action, as previously described, enables the true error signal, or difference between the variable and some predetermined set point value, to be rapidly changed to a zero value only when the variable is brought into very close proximity with the set point value. This ancillary means thus permits an input motion type of controller to transmit an overshot signal to a final control element such as a control valve 60 so that it will be rapidly closed just before the variable reaches a predetermined set point value. It is in this manner that the ancillary compensating means of the present invention is useful and effective in automatically preventing a variable from overshooting a predetermined set point value. Thus, when the ancillary compensating means is used to control a batch process as already described it will eliminate the usual need for an attendant to be present as the process goes from a fully shut down condition to an optimum controlled condition.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. A means for obtaining optimum response for an integral acting control instrument during automatic start-up of same comprising, an error beam, a spring and dash pot means acting on said beam, said beam being operably connected to a flapper regulated bleed valve by an error bar to regulate the fluid pressure output of said control instrument, a link means operably connected at one end to a sensing element at its other end to said beam, said link means acting through said beam and error bar to transduce the magnitude of a variable into a bleed valve pressure that is proportional to said variable, a second link means connecting a control index adjusting means to said beam and said error bar and said error beam connections attached thereto effecting a motion to the flapper of said flapper regulated valve to overcome the integral action of said control instrument during said automatic start-up.

2. An improvement in a controlling apparatus wherein a controller is actuated by the pressure of an elastic fluid, an elastic fluid pressure bleed valve is operably bled in accordance with the magnitude of a controlled condition and wherein said actuation caused by said fluid pressure provides an elastic fluid control pressure proportional to said controlled condition, a vehicle is used to transmit said fluid control pressure to the head of a control valve and wherein the control pressure is used to adjust the magnitude of the elastic fluid pressure force acting on said controller, and a control index is used to adjust the set-point of said controller, said improvement comprising a spring balanced error beam, said beam being located between said index and said controller, said beam being operably connected to said index at one of its ends, a variable sensing means to displace the other end of said beam in accordance with the magnitude of said controlled condition, a dashpot attached to said control index end of said beam, said other end of said beam being operably displaced from a horizontal position when said magnitude of said controlled condition is lowered to a predetermined minimum value, a link pivotally and operably connecting a portion of the beam between its ends with said bleed valve, said displacement of said beam being of such magnitude as to cause the pivot connecting the said link to said beam to temporarily act as if the set-point of said control index were suppressed without actually altering the set-point setting of said index.

3. A means of effecting a temporary lowering of the set-point of an elastic fluid pressure actuated integral acting control instrument during shut down of a controlled batched process without incurring any change in the set-point index setting of said controller, said control instrument including a flapper regulated bleed valve comprising, a spring balanced substantially rectangular shaped linkage having a beam forming the base of said linkage, a dampening means and spring means operably attached to the one end of said beam; a first link pivotally attached to said beam through said spring means forming one of the vertical legs of said linkage, said first link being pivotally attached to and moved by a set point index adjusting link means forming a top portion of said linkage at said one end, a second link pivotally attached to the other end of said beam forming a second of the vertical legs of said linkage, said second link being pivotally attached to and moved by a link means forming a top portion of said linkage at said other end, said link means acting to introduce into said linkage a mechanical motion proportional to the magnitude of a controlled condition, said beam being operably connected to said flapper regulated bleed valve of said control instrument whereby a predetermined movement of said first link in an upward direction will regulate the bleed from said valve so as to place the rectangular linkage in a position to overcome the integral action of said controller.

4. An improvement in a controlling apparatus wherein, a controller is actuated by the pressure of an elastic fluid, an elastic fluid pressure bleed valve is operably bled in accordance with the magnitude of a controlled condition and wherein said actuation caused by said fluid pressure provides an elastic fluid control pressure proportional to said controlled condition, a vehicle is used to transmit said fluid control pressure to the head of a control valve and wherein the control pressure is used to adjust the magnitude of the elastic fluid pressure force acting on said controller and a control index is used to adjust the set-point of said controller, said improvement comprising a spring balanced error beam, said beam being located between said controller and said index, said beam being connected to said index at one of its ends, a sensing means to displace the other end of said beam in accordance with the magnitude of said controlled condition, a dash-pot attached to said control index end of said beam, said other end of said beam being operably displaced from a horizontal position when said magnitude of said controlled condition is lowered to a predetermined minimum value, a link pivotally and operably connecting a portion of the beam midway between its ends with said bleed valve, said displacement of said beam being of such magnitude as to cause the pivot connecting the said link to said beam to temporarily act as if the set point of said control index were suppressed without actually altering the set-point setting of said index.

5. A beam normally positioned in a first plane, a biasing means pivotally connected at one of its ends to one of the ends of said beam and at its other end to a control index, a regulable dampening means attached to said beam connection, a pressure to mechanical motion transducing link means pivotally connecting the other end of said beam for transmitting instantaneous mechanical motions to said beam proportional to the magnitude of a controlled condition, a link pivotally connected at one end to said beam at a point midway between the ends of said beam and having its other end operably connected to a means for regulating the fluid pressure output of a bleed valve in accordance with the difference between the dampened setting of said control index and any one of said instantaneous mechanical motions, a second biasing means for positioning said first mentioned pivoted beam connection in a position which is at one side of said first plane at a predetermined period of time after said transducing means is regulated by said condition to move said other end of said beam from said plane in the opposite direction, and said second biasing means acting to retain said depressed end of said beam in said depressed position until said transducer returns the pivot connection between said link and said beam to a position which is at said one side of said plane.

6. A beam normally positioned in a first plane, a biasing means pivotally connected at one of its ends to one of the ends of said beam and at its other end to a control index, a pressure to mechanical motion transducing link means pivotally connected to a portion of the other end of said beam for transmitting instantaneous mechanical motions to said beam proportional to a controlled condition, a regulable dampening means attached to said last mentioned beam end at a portion spaced from said transducing link connection, a link pivotally connected at one end to said beam at a point midway between the ends of said beam and having its other end operably connected to a means for regulating the fluid pressure output of a bleed valve in accordance with the difference between the dampened setting of the said control index and any one of said instantaneous mechanical motions, said biasing means acting to position said first mentioned pivoted beam connection to one side of said first plane at a predetermined period of time after said transducing means is regulated by said controlled condition to move said other end of said beam to the opposite side of said first plane and said biasing means acting to retain said end of said beam having said first mentioned pivoted beam connection in said position that is on said one side of said plane until said transducer movement returns the said pivot connection between said link and said beam to a position on said one side of said plane.

7. A beam normally positioned in a first plane, a biasing means connected to said beam, a control index, a pressure to mechanical motion transducing link means pivotally connected to a portion of the end of said beam for transmitting instantaneous mechanical motions to said beam proportional to a controlled condition, a regulable damping means attached to said beam, a link pivotally connected at one end to said beam at a point midway between the ends of said beam and having its other end operably connected to a means which regulate the fluid pressure output of a bleed valve in accordance with the difference between the setting of the said control index and any one of said instantaneous mechanical motions, said biasing means acting to position said first mentioned pivoted beam connection to an extended position on one side of said first plane at a predetermined period of time after said transducing means is regulated by said condition to move said beam from said first plane in the opposite direction from said biasing means, and said biasing means acting to retain an extended end of said beam in said extended position until said transducer movement returns the said pivot connection between said link and said beam to a position on the opposite side of said first plane.

8. A beam positioned in a first plane, a first link parallel to and pivotally connected by a second link to one end of said beam, a biasing means connected to one end of said first link at a position spaced from said second link connection, a pressure to mechanical motion transducing link means pivotally connecting a portion of the other end of said first link for transmitting instantaneous mechanical motions to said beam proportional to a controlled condition, a regulable damping means attached to said first link at an end portion spaced from said transducing link connection, said other ends of said beam being pivotally connected by a link to a control index, an error link pivotally connected at one end to said beam at a point midway between the ends of the beam and having its other end operably connected to a means for regulating the fluid pressure output of a bleed valve in accordance with the difference between the dampened settings of the said controller index and any one of said instantaneous mechanical motions, said biasing means acting to position said error link beam pivot connection and the beam pivot of said second link on one side of said first plane at a predetermined period of time after said transducing means is regulated by said condition to move said beam from said plane in a downward direction, said biasing means acting to retain said end of said beam on said one side of said beam until said transducer movement returns the said pivot connection between said error link and said beam to a position above said first plane.

9. A compensated rate unit for modifying the input to a motion type controller comprising an error beam, an input motion connection applied to one end thereof, a floating pivot, said pivot being supported by a floating piston on one side of said beam and by a co-acting spring means on the direct opposite side of said beam connection on the other end of said error beam, and an error link pivotally connected for movement at one end to said beam at a point intermediate the ends of said beam and at its other end to a flapper regulated bleed valve to regulate the fluid pressure output of said controller.

10. Apparatus as defined in claim 9 wherein said error beam has a resilient biasing means connected to move said piston to an end position when the input motion connection has been moved to a predetermined end position.

11. A compensated rate unit for reducing the time required by a motion type controller to make a variable line out at a predetermined set point value comprising, an error beam having a longitudinal axis that is located in a horizontal plane when said variable is lined out with said set point value, an error link operably connected by a pivot intermediate the ends of said error beam to regulate the fluid bled from a bleed valve of said controller in accordance with the position of said pivot, a mechanism for vertically moving one end of said beam an amount that is proportional to the magnitude of the said variable, a manually positioned set point index spring and damping means pivotally connected to the other end of the error beam and said spring and damping means being operably connected to said beam to retain the said pivot between said beam and said error link in a position that will cause the magnitude of the fluid bled from said valve to be abnormally increased just before said beam moving mechanism has moved the beam into the said position in which the variable has been lined out with said predetermined set point value.

References Cited in the file of this patent

UNITED STATES PATENTS

| | | |
|---|---|---|
| 1,204,564 | Grun | Nov. 14, 1916 |
| 1,372,502 | Grun | Mar. 22, 1921 |
| 2,125,081 | Moore | July 26, 1938 |
| 2,352,312 | Donaldson | June 27, 1944 |
| 2,637,301 | Burdick | May 5, 1953 |